United States Patent
Tedesco et al.

(10) Patent No.: US 7,307,804 B2
(45) Date of Patent: Dec. 11, 2007

(54) THERMALLY STABILE GRISMS

(75) Inventors: James M. Tedesco, Livonia, MI (US); Joseph B. Slater, Dexter, MI (US)

(73) Assignee: Kaiser Optical Systems, Ann Arbor, MI (US)

( * ) Notice: Subject to any disclaimer, the term of this patent is extended or adjusted under 35 U.S.C. 154(b) by 0 days.

(21) Appl. No.: 11/333,046

(22) Filed: Jan. 17, 2006

(65) Prior Publication Data

US 2006/0159396 A1 Jul. 20, 2006

Related U.S. Application Data

(60) Provisional application No. 60/644,177, filed on Jan. 14, 2005.

(51) Int. Cl.
*G02B 5/04* (2006.01)
*G02B 7/18* (2006.01)

(52) U.S. Cl. .................. 359/831; 359/837; 359/15; 359/566; 385/37

(58) Field of Classification Search .............. 359/15, 359/831, 837, 566; 385/37
See application file for complete search history.

(56) References Cited

U.S. PATENT DOCUMENTS

| | | | |
|---|---|---|---|
| 6,829,090 B2 * | 12/2004 | Katsumata et al. | 359/486 |
| 2004/0070853 A1 * | 4/2004 | Ebizuka et al. | 359/833 |
| 2004/0223201 A1 * | 11/2004 | Dickson | 359/15 |
| 2005/0243421 A1 * | 11/2005 | Arns | 359/558 |

OTHER PUBLICATIONS

HandBook of Optics, vol. II, M.Bass Editor, McGraw-Hill, pp. 33.58, 33.60 (1995).*

\* cited by examiner

*Primary Examiner*—Leonidas Boutsikaris
(74) *Attorney, Agent, or Firm*—Gifford, Krass, Sprinkle, Anderson & Citkowski, PC

(57) ABSTRACT

Thermally stable GRISMs comprise a substrate and cover plate composed of a first material keeps the spatial frequency of the grating stable with temperature, and a prism composed of a second material having lower thermal coefficient of refractive index than that of the first material. In the preferred embodiment, the first material is fused silica, and the second material is BK7 glass.

10 Claims, 1 Drawing Sheet

THERMALLY STABILE GRISMS

REFERENCE TO RELATED APPLICATION

This application claims priority to U.S. Provisional Patent Application Ser. No. 60/644,177, filed Jan. 14, 2005, the entire content of which is incorporated herein by reference.

FIELD OF THE INVENTION

This invention relates generally to transmission gratings (GRISMs) and, in particular, to thermally stable GRISMs.

BACKGROUND OF THE INVENTION

A GRISM is a transmission grating coupled to prism. In comparison with a more typical flat grating, a GRISM enables the use of higher spatial frequency and hence yields higher angular dispersion. Such devices therefore find utility in various applications, including spectrometers, telecommunications, and others. Conventionally, fused silica is used both as the substrate and cover plate for transmission gratings because of its low coefficient of thermal expansion and resulting thermal stability of the grating spatial frequency. However, the thermal coefficient of refractive index associated with fused silica is quite high, such that it may be unsuitable for use as a prism, otherwise more than offsetting its low thermal expansion coefficient where significant prism power is employed. Thus, a solution to this problem is desirable.

SUMMARY OF THE INVENTION

This invention resides in transmission gratings (GRISMs) and, in particular, to thermally stable GRISMs. According to the invention, a substrate and cover plate composed of a first material keeps the spatial frequency of the grating stable with temperature, and a prism composed of a second material having lower thermal coefficient of refractive index than that of the first material. In the preferred embodiment, the first material is fused silica, and the second material is BK7 glass. Successful lamination of the two dissimilar materials, particularly if the grism must withstand extended temperature variations, requires appropriate selection of an adhesive that can accommodate the different thermal expansion coefficients. In the preferred embodiment, the adhesive used is Dymax OP-4-20639, which is selected for its very low glass transition temperature and resulting flexibility over wide temperature ranges.

DETAILED DESCRIPTION OF THE INVENTION

Figure 1:
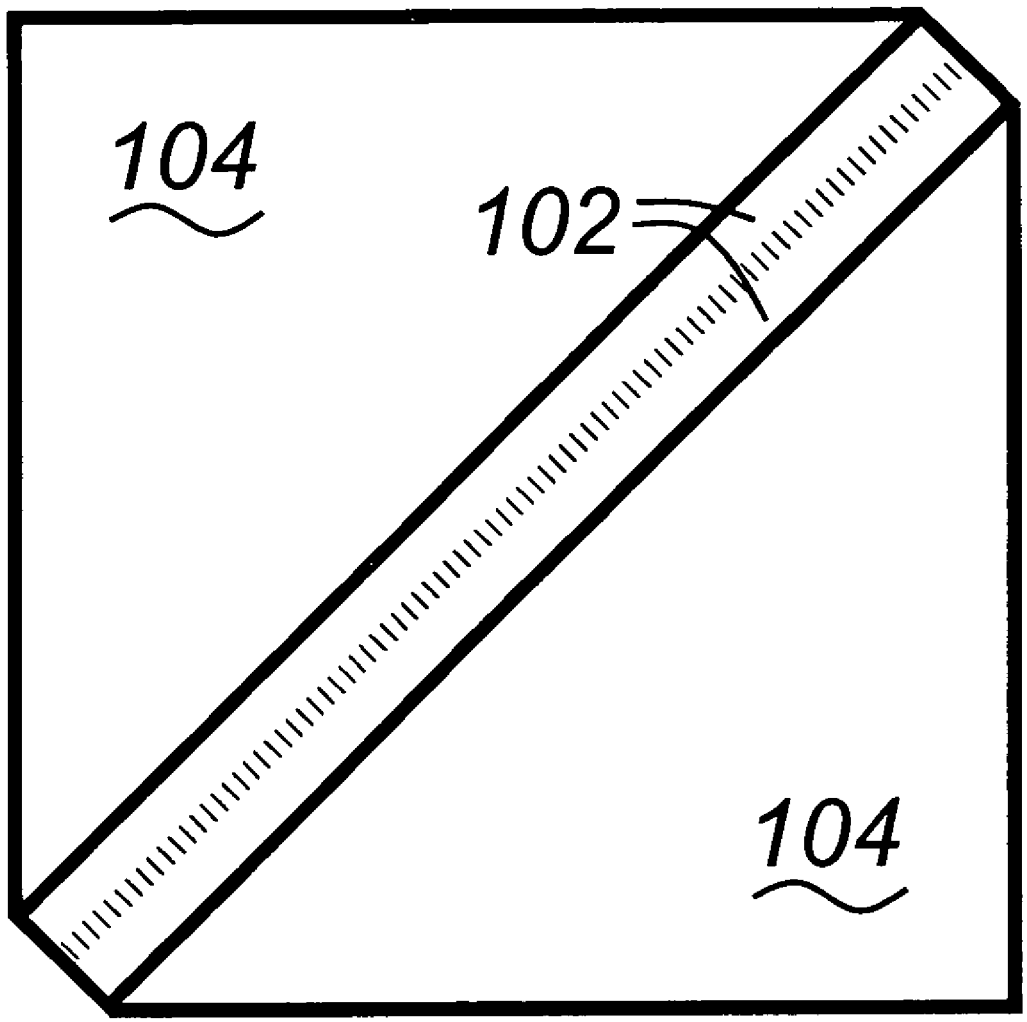
FIG. 1 is a drawing of a thermally stable GRISM according to the invention.

This invention improves upon existing GRISM configurations through the use of different substrate and prism materials to improve the thermal stability. The preferred embodiment, shown in FIG. 1, resides in a generic transmission GRISM wherein the transmission grating is constructed on a flat fused silica substrate with a flat fused silica cover (102). Fused silica is the transmissive optical substrate material with the lowest available thermal expansion coefficient (though not zero), thus keeping the grating spatial frequency stable with temperature.

The prisms (104) preferably use BK-7 or other suitable glass which has a much lower thermal coefficient of refractive index than fused silica, thus keeping the total angular dispersion of the grism assembly significantly more stable over temperature than would either an all-BK7 assembly or an all-fused-silica assembly.

The FS/BK7 construction could be used to improve the thermal stability of existing and yet-to-be developed devices, including GRISMs such as the UltraSpec-C160 and holographic laser bandpass filters patented by Kaiser Optical Systems, Inc. Although a right-angle prisms are shown in FIG. 1, non-right angle prisms are not precluded by the invention. In addition, although reflection gratings are generally made on a true "zero expansion" substrate (such as Zerodur, which cannot be used for transmission gratings because cannot be made sufficiently homogeneous), reflection gratings can and have been bonded to, or embedded in, prisms. Thus all the same concepts disclosed herein apply equally well to reflection gratings, e.g. laminating BK-7 to Zerodur (for example), for low thermal sensitivity, or balancing some other prism and substrate combination to "perfectly" balance the effects grating period thermal expansion with those of the prism's thermal refractive index change.

According to this invention, it should also be possible to design a GRISM configuration with appropriate glasses and prism angles such that the thermal characteristics of the prism refractive index and the small thermal expansion of the fused silica grating exactly cancel each other, yielding a perfectly stable GRISM output angle vs. temperature.

For straight minimization of thermal coefficient of refractive index, BK7 is an excellent choice, having a coefficient of dN/dT (absolute)=0.9E-6/degree C. at 1060 nm. By comparison, fused silica is 12.8E-6, or more than 10 times higher, and BK1 is only 0.1E-6. These are "absolute" refractive index coefficients, appropriate for application in vacuum. "Relative" refractive index is probably more important in free space applications in air, where it is the difference in index between the glass and air (which also changes index with temperature) is more important. LaF2 is an example of a material with a low relative index coefficient of 0.2E-6 at 1060 nm.

The characteristics of other glasses vary considerably, and are available with both positive and negative coefficients. For example, SF6 is about +6E-6 and PK51 is about −10E-6, with various types of glasses in between. This suggests that it may be possible to select different glasses to match a particular operating wavelength, grating frequency, and spatial frequency. Practical matters such as cost and availability may dictate glass selection more than the best overall match.

We claim:

1. A GRISM, comprising:
   a diffraction grating encapsulated between a substrate and cover plate composed of a first material that keeps the spatial frequency of the grating stable with temperature; and
   a prism having a face bonded to the encapsulated diffraction grating, the prism being composed of a second material having lower thermal coefficient of refractive index than that of the first material.

2. The GRISM of claim 1, wherein the first material is fused silica.

3. The GRISM of claim 1, wherein the second material is BK7 glass.

4. The GRISM of claim 1, wherein the prism is a right-angle prism.

5. The GRISM of claim 1, including two prisms, each having a face bonded to an opposing side of the encapsulated diffraction grating.

6. The GRISM of claim 5, wherein both prisms are right-angle prisms.

7. A GRISM, comprising:
a diffraction grating encapsulated between a substrate and cover plate composed of fused silica; and
a prism having a face bonded to the encapsulated diffraction grating, the prism being composed of BK7 glass.

8. The GRISM of claim 7, wherein the prism is a right-angle prism.

9. The GRISM of claim 7, including two prisms, each having a face bonded to an opposing side of the encapsulated diffraction grating.

10. The GRISM of claim 9, wherein both prisms are right-angle prisms.

* * * * *